Patented Aug. 9, 1932

1,870,601

UNITED STATES PATENT OFFICE

EDGAR C. BRITTON AND WILLIAM R. REED, OF MIDLAND, MICHIGAN, ASSIGNORS TO THE DOW CHEMICAL COMPANY, OF MIDLAND, MICHIGAN, A CORPORATION OF MICHIGAN

HYDROLYSIS OF METHYL CHLOROFORM

No Drawing.    Application filed December 18, 1928.    Serial No. 326,904.

The present invention relates to the hydrolysis of methyl chloroform whereby a novel and hitherto unsuspected method is afforded for the manufacture of the commercially valuable compounds acetic acid, acetyl chloride and acetic anhydride. Such method possesses great advantages in directness an simplicity of operation and in the high yields obtainable thereby.

To the accomplishment of the foregoing and related ends the invention, then, consists of the steps hereinafter fully disclosed and particularly claimed, the following description setting forth but a few of the ways in which the principle of the invention may be used.

Methyl chloroform, $CH_3CCl_3$, which is a homologue of chloroform, $HCCl_3$, is most directly obtained as one of the products of the chlorination of ethane, although it may be prepared in other known ways. It is a very stable compound and does not readily enter into chemical reaction. For example, at ordinary pressure it is hydrolyzed by direct action of water only with extreme slowness, and, in fact, boiling with water for a period of several days effects only a very slight hydrolysis with the formation of a small amount of acetic and hydrochloric acids.

We have found, however, that if the reaction is conducted under pressure at temperatures above the atmospheric boiling point of methyl chloroform, e. g. 75° C., the hydrolysis is greatly accelerated so that practically complete conversion of methyl chloroform to acetic and hydrochloric acids takes place within a relatively short time. Temperatures up to about 150° to 160° C. or higher may be advantageously employed. We have found that the reaction is further promoted by the use of an anhydrous metallic chloride as catalyst, such as ferric, colbalt or zinc chlorides. By varying the proportion of water, the reaction may be directed to the formation of acetic acid, acetyl chloride or acetic anhydride in accordance with the following equations;

(1)  $CH_3CCl_3 + 2H_2O \rightarrow CH_3COOH + 3HCl$
(2)  $CH_3CCl_3 + H_2O \rightarrow CH_3COCl + 2HCl$
(3)  $2CH_3CCl_3 + 3H_2O \rightarrow$
          $(CH_3CO)_2O + 6HCl$ The above reactions are also catalyzed by the presence of concentrated sulphuric acid. The latter may be utilized to advantage in the preparation of acetic acid, but it is less well adapted to the preparation of acetyl chloride or acetic anhydride owing to the difficulty of separating such compounds completely from the sulphuric acid in the reaction product. In the latter case acetyl sulphuric acid is formed by reaction of sulphuric acid with acetyl chloride or acetic anhydride. When only a relatively small amount of acid is used, however, the loss of product by secondary formation of acetyl sulphuric acid is correspondingly small. Likewise where the product is to be used in a further reaction, wherein the presence of some sulphuric acid is not a detriment, the mixture of acetic anhydride or acetyl chloride and acetyl sulphuric acid may be used without separation.

*Example 1.*—1 mole methyl chloroform is heated under pressure with 2 moles or slightly more of water at approximately 150° C. for about 10 hours. Yield of acetic acid practically 100 per cent.

*Example 2.*—1 mole methyl chloroform, to which is added 2 per cent of anhydrous ferric chloride, is heated under pressure to 150° to 160° C., while 1 mole water is added drop by drop to the hot reaction mixture. The product is acetyl chloride in very good yield.

*Example 3.*—Approximately $\frac{1}{10}$ mole concentrated sulphuric acid is heated to 100° C. and methyl chloroform and water, in proportion of 1 mole of the former to 2 moles of the latter, are gradually added while maintaining the mixture under pressure due to vapor pressure of reactants. The product is acetic acid in very good yield.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. The method for the hydrolysis of methyl chloroform which comprises heating such compound under pressure in excess of atmospheric with water at a temperature above 75° C.

2. The method for the hydrolysis of methyl chloroform which comprises heating such compound under pressure in excess of atmospheric with water at a temperature above 75° C. in the presence of a catalyst.

3. The method for the hydrolysis of methyl chloroform which comprises heating such compound under pressure in excess of atmospheric with water at a temperature above 75° C. in the presence of an anhydrous metallic chloride as catalyst.

4. The method of making acetic acid which comprises heating methyl chloroform and water in the proportion of 1 mole of the former to at least 2 moles of the latter under pressure in excess of atmospheric at a temperature between 75° and 160° C.

5. The method of making acetic acid which comprises heating methyl chloroform and water in the proportion of 1 mole of the former to at least 2 moles of the latter under pressure in excess of atmospheric at a temperature between 75° and 160° C. in the presence of a catalyst.

6. The method of making acetyl chloride which comprises heating methyl chloroform and water in approximately equimolecular proportion under pressure corresponding to the vapor pressure of the reaction mixture at a temperature between 75° and 160° C. in the presence of a catalyst.

7. The method of making acetic anhydride which comprises heating methyl chloroform and water in the proportion of approximately 2 moles of the former to 3 moles of the latter under pressure corresponding to the vapor pressure of the reaction mixture at a temperature between 75° and 160° C. in the presence of a catalyst.

Signed by us this 14th day of December, 1928.

EDGAR C. BRITTON.
WILLIAM R. REED.